United States Patent [19]

Galvin

[11] Patent Number: 5,297,448
[45] Date of Patent: Mar. 29, 1994

[54] CRANK MECHANISM

[76] Inventor: George F. Galvin, 9 Christchurch Rd., Sidcup, Kent DA15 7HG, England

[21] Appl. No.: 910,186

[22] PCT Filed: Jan. 21, 1991

[86] PCT No.: PCT/GB91/00087
§ 371 Date: Jul. 16, 1992
§ 102(e) Date: Jul. 16, 1992

[87] PCT Pub. No.: WO91/10848
PCT Pub. Date: Jul. 25, 1991

[30] Foreign Application Priority Data

Jan. 22, 1990 [GB] United Kingdom ............... 9001413
Jan. 21, 1991 [WO] PCT Int'l Appl. ............... PCT/GB91/00087

[51] Int. Cl.$^5$ .................. F16H 25/14; F02B 75/22; F02B 75/32
[52] U.S. Cl. ................... 74/55; 123/55 AA; 123/197.4
[58] Field of Search .................. 74/25, 44, 55; 123/44 R, 55 R, 55 AA, 197.4

[56] References Cited

U.S. PATENT DOCUMENTS

| 1,783,589 | 12/1930 | Shepard | 74/55 |
| 1,931,401 | 10/1933 | Baisden | 74/55 |
| 2,120,657 | 6/1938 | Tucker | 123/55 AA |
| 2,528,386 | 10/1950 | Napper | 74/55 |

Primary Examiner—Allan D. Herrmann
Attorney, Agent, or Firm—Thomas J. Dodd

[57] ABSTRACT

A crank mechanism for an internal combustion engine comprises a cylinder, a piston reciprocalable within the cylinder, and a rotatable shaft. The piston is in drivable in connection with the shaft via a connecting rod, a slipper, and a torque lob. The connecting rod is pivotally fixed to the piston, and the slipper is pivotally attached to the free end of the connecting rod. The torque lob is a circular plate eccentrically mounted on the shaft for rotation therewith about the axis thereof. The slipper is slidable along but restrained to the rim of the torque lob. The slipper is constrained to move around a close path, whereby rectilinear movement of the piston is converted to rotary movement of the torque lob or vice versa.

16 Claims, 9 Drawing Sheets

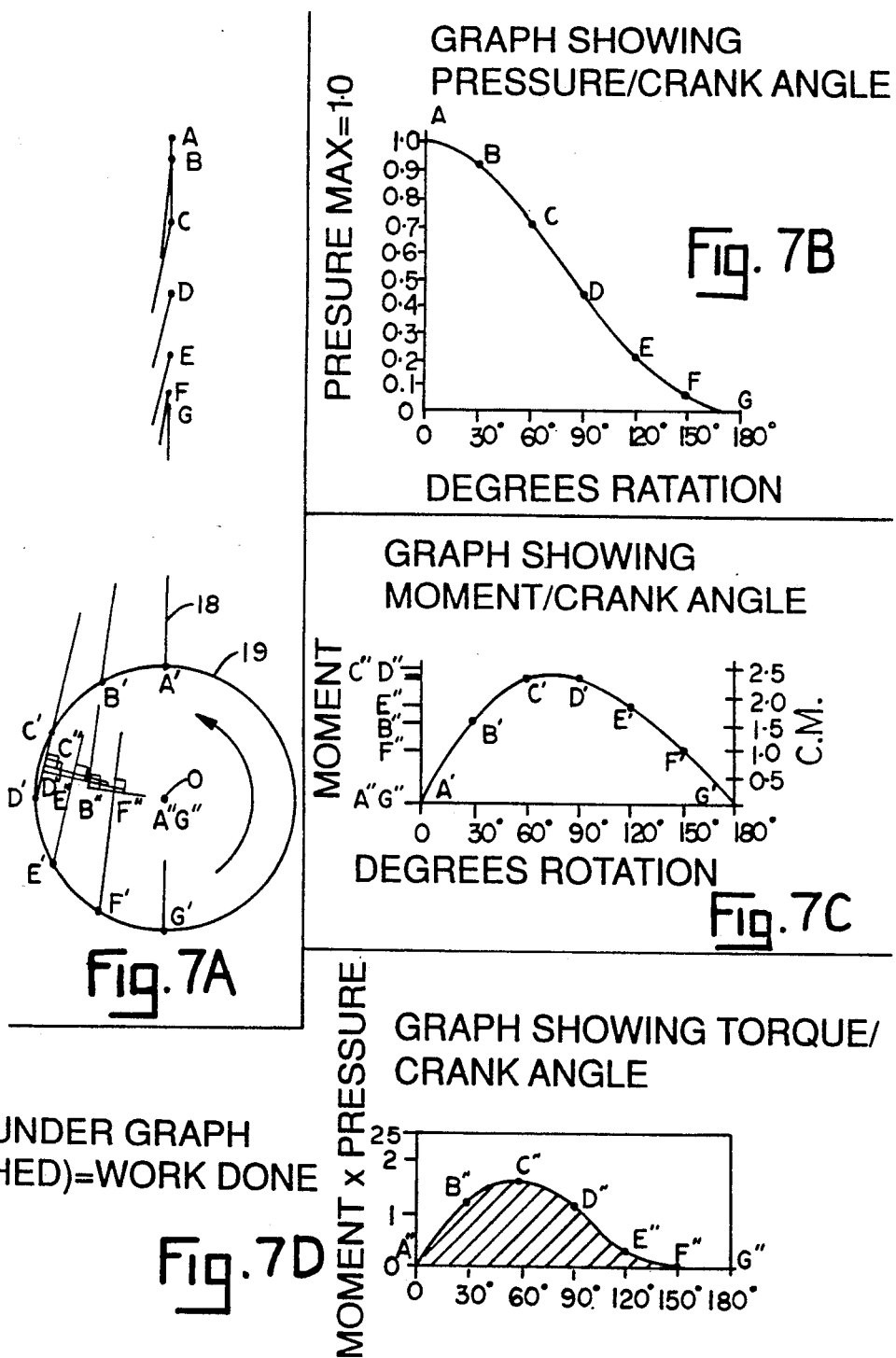

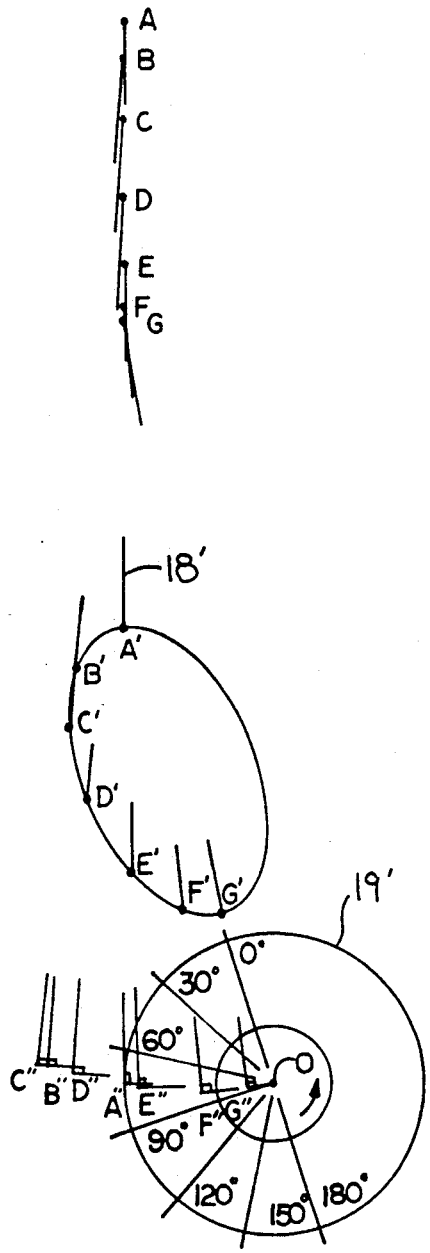
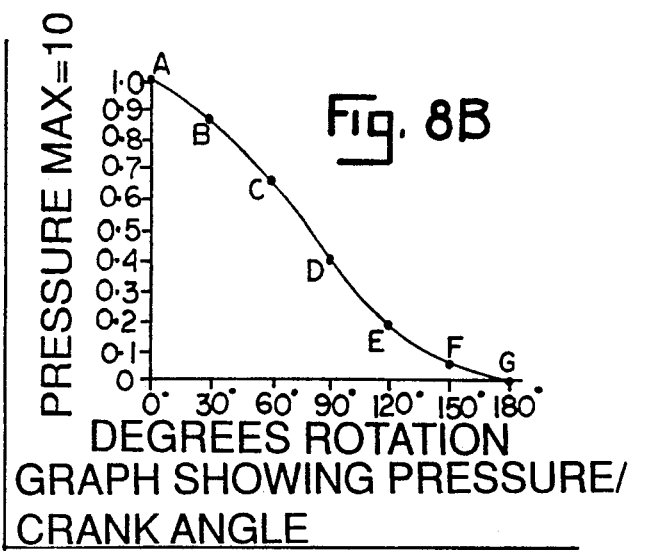
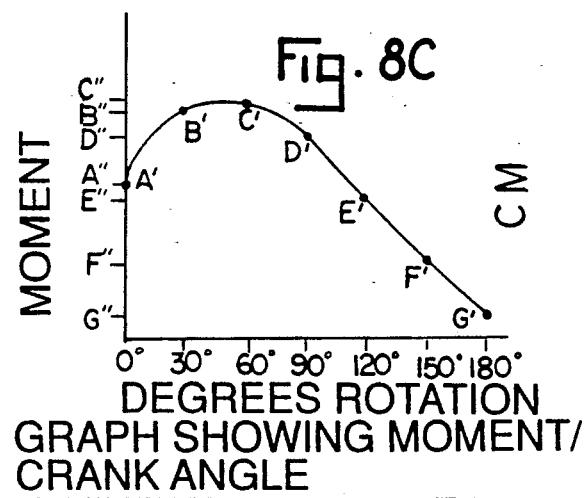
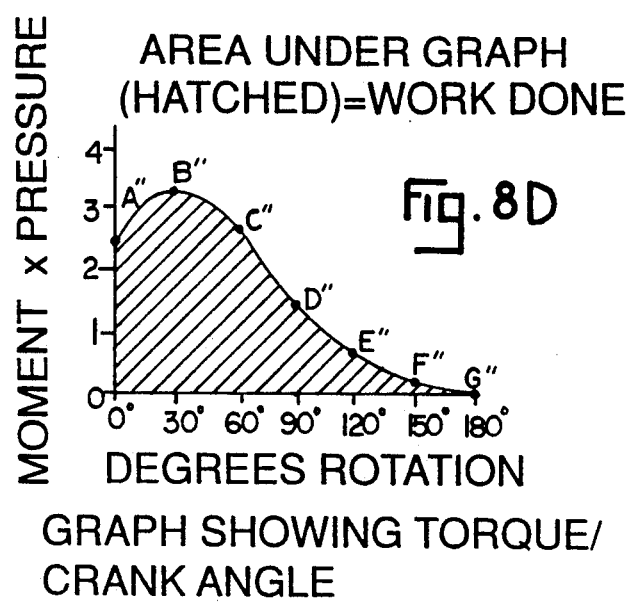
Fig. 8A
Fig. 8B — GRAPH SHOWING PRESSURE/CRANK ANGLE
Fig. 8C — GRAPH SHOWING MOMENT/CRANK ANGLE
Fig. 8D — AREA UNDER GRAPH (HATCHED)=WORK DONE — GRAPH SHOWING TORQUE/CRANK ANGLE

CRANK MECHANISM

SUMMARY OF THE INVENTION

This invention relates to a crank mechanism for an internal combustion engine.

A conventional internal combustion engine employs a crankshaft to convert the reciprocating motion of the piston(s) into output torque to propel a vehicle or to act upon any other load. The crankshaft is inefficient in terms of converting the power available from the fuel combustion into usable output torque. This is because combustion of the fuel/air mixture takes place at approximately the top dead center (TDC) position of the piston. Not only the crankpin, but also the crankshaft main bearing, are consequently subjected to periodic heavy stresses. What is of greater significance, however, is that, with an internal combustion engine provided with conventional drive gear, the ignited fuel/air pressure forces cannot produce torque when the piston is either at TDC or bottom dead center (BDC), as the connecting rod and the crankpin are practically in a straight line so that there is no force component tangential to the crank circle. The torque necessary to carry the crankshaft through these two dead center positions is supplied by the inertia of the flywheel of the engine. Moreover, by the time the crankshaft has rotated through 90° beyond TDC, where the turning moment is a maximum, the piston force is greatly reduced, so that the resulting torque is relatively small.

The present invention provides a crank mechanism for an internal combustion engine, the crank mechanism comprising a cylinder, a piston reciprocable within the cylinder, and a rotatable shaft, the piston being in drivable connection with the shaft via a connecting rod, a slipper and a torque lobe, the connecting rod being pivotally fixed to the piston, and the slipper being pivotally attached to the free end of the connecting rod, wherein the torque lobe is a circular plate eccentrically mounted on the shaft for rotation therewith about the axis thereof, wherein the slipper slidable along, but restrained to, the rim of the torque lobe, and wherein the slipper is constrained to move around a closed path whereby rectilinear movement of the piston is converted to rotary movement of the torque lobe or vice versa.

The invention also provides a crank mechanism for an internal combustion engine, the crank mechanism comprising a plurality of cylinders, a respective piston reciprocable within each of the cylinders, and a rotatable shaft, each of the pistons being in drivable connection with the shaft via a respective connecting rod, a respective slipper and a common torque lobe, each connecting rod being pivotally fixed to the associated piston, and each slipper being pivotally attached to the free end of the associated connecting rod, wherein the torque lobe is a circular plate eccentrically mounted on the shaft for rotation therewith about the axis thereof, wherein each slipper is slidable along, but restrained to, the rim of the torque lobe, and wherein each slipper is constrained to move around a respective closed path whereby rectilinear movement of the pistons is converted to rotary movement of the torque lobe or vice versa.

Advantageously, the or each slipper is provided with cam follower means which engage with associated cam track means adjacent to the torque lobe, the cam follower means and the cam track means constituting means for constraining that slipper to move round the associated closed path. Conveniently, the or each slipper is provided with a pair of cam followers which engage with a respective pair of cam tracks formed symmetrically in a pair of plates positioned on opposite sides of the torque lobe.

The cam followers of the or each slipper may be bearings, preferably roller bearings; and the associated cam tracks may be of elliptical configuration. In this case, the major axes of the or each pair of elliptical cam tracks do not pass through the shaft.

In a preferred embodiment, the rim of the torque lobe is constituted by a flange extending in both directions beyond the circular plate constituting the torque lobe, the or each slipper being formed with inturned flanges which slidably grip the torque lobe flange. Alternatively, the slipper is clamped to the outer race of a roller bearing mounted on the torque lobe.

The or each slipper may be provided with an anti-reverse mechanism for ensuring that that slipper moves round the associated closed path in one direction only. Advantageously, the or each anti-reverse mechanism is such as to ensure that the associated cam followers are moved through the major axes of the associated pair of elliptical cam tracks as the associated piston reaches BDC or TDC on each stroke.

In a preferred embodiment, the or each anti-reverse mechanism is constituted by two rotatable wheels, each of which is in drivable engagement with the shaft, and each of which is provided with an eccentrically-positioned pin, the mechanism being such that one of the pins is engageable with the associated slipper as the associated piston reaches BDC on each stroke, and such that the other pin is engageable with the associated slipper as the associated piston reaches TDC on each stroke.

Advantageously, the rotatable wheels of the or each anti-reverse mechanism are gear wheels, one of which drives the other, and said one gear wheel is in drivable engagement with a further gear wheel fixed to, and rotatable with, the shaft. The or each anti-reverse mechanism may further comprise an idler gear wheel in meshing engagement with said rotatable gear wheels.

Where the crank mechanism has a plurality of pistons, cylinders and slippers, the further gear wheel if common to all the anti-reverse mechanisms.

Preferably, the rotatable wheels of the or each anti-reverse mechanism are housed in a respective recess formed in a plate parallel, and adjacent, to the torque lobe.

The invention will now be described in greater detail, by way of example, with reference to the accompanying drawings, in which:

BRIEF DESCRIPTION OF THE DRAWINGS

FIGS. 7a, 7b, 7c and 7d are diagrams illustrating the derivation of the torque output of a conventional internal combustion engine;

FIGS. 8a, 8b, 8c and 8d are diagrams illustrating the derivation of the torque output of the engine of FIGS. 1 and 2.

DESCRIPTION OF THE PREFERRED EMBODIMENT

Figure 1:
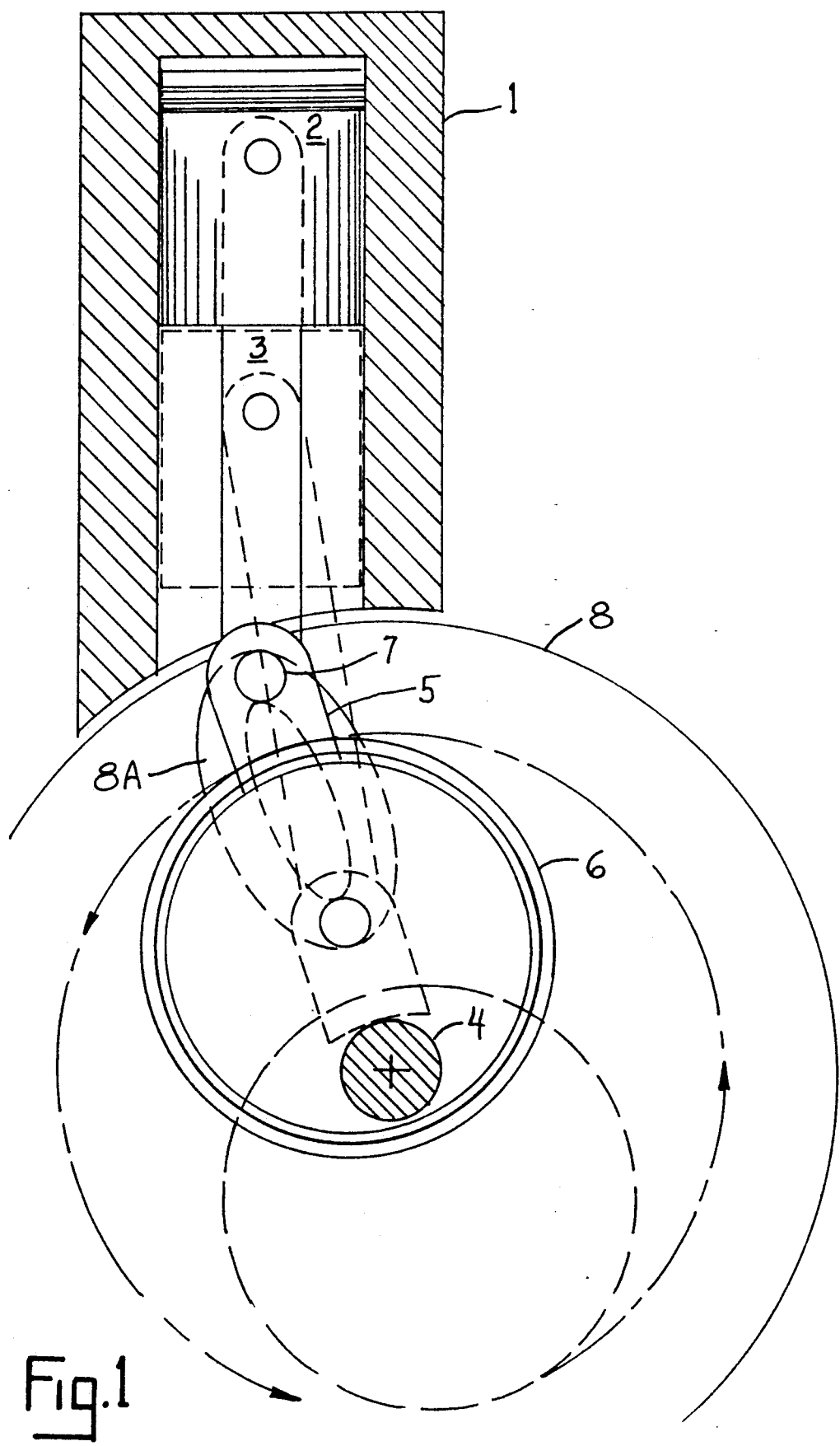
FIG. 1 is a schematic part-sectional elevation of a simplified form of internal combustion engine which illustrates the principle of the invention.
Figure 2:
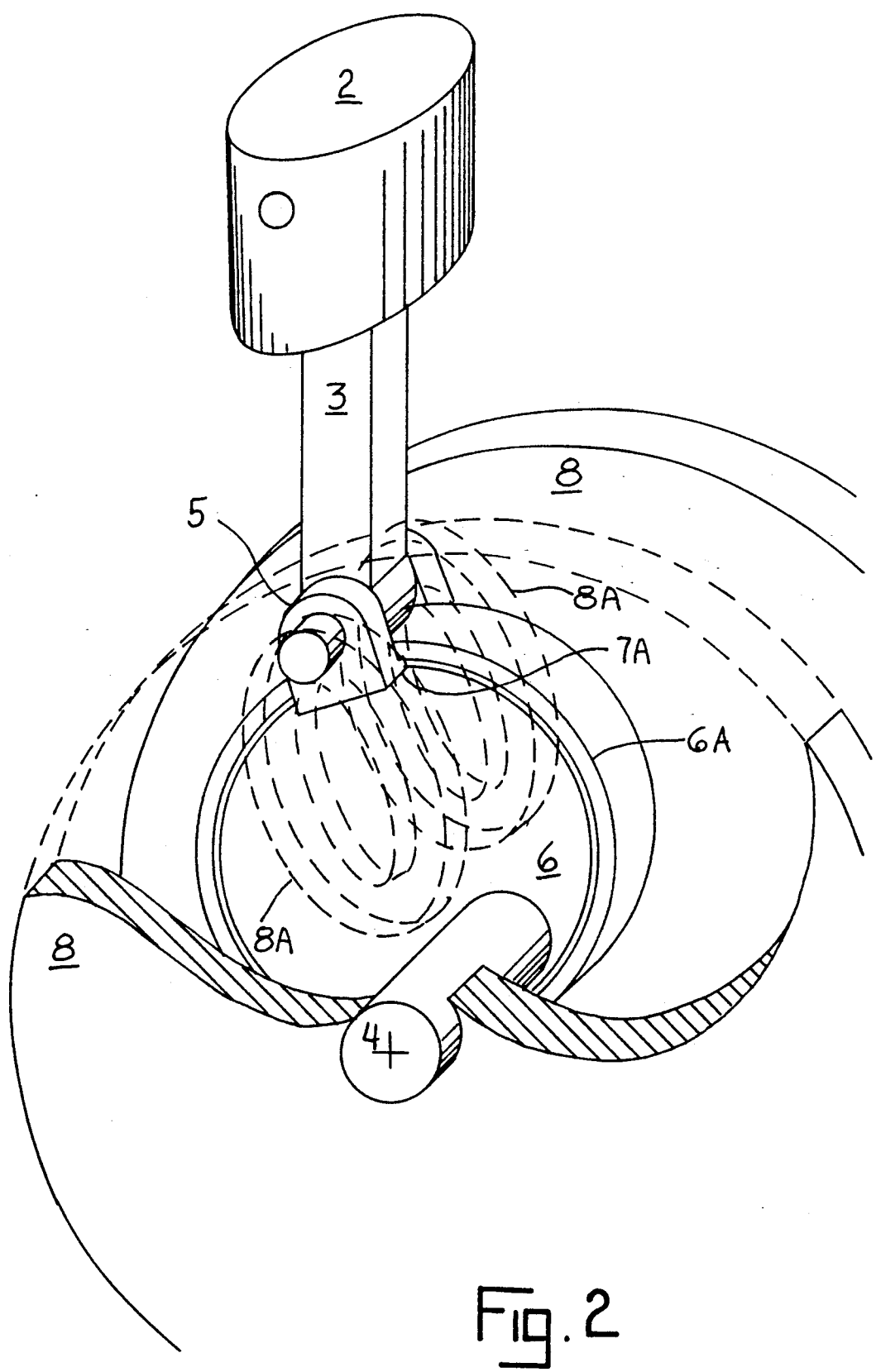
FIG. 2 is a schematic, partially broken away, perspective view of the engine of FIG. 1.

Referring to the drawings, FIGS. 1 and 2 show a simple form of internal combustion engine which operates on a four stroke cycle. The engine has a single cylinder 1 in which a piston 2 is reciprocable. The piston-and-cylinder arrangement 1,2 has a conventional valve arrangement (not shown), and can be powered by either petrol or diesel as fuel. A connecting rod 3 is fixed to the piston 2, the connecting rod rotatably driving an output shaft 4 via a slipper 5 and a torque lobe 6. The torque lobe 6 is constituted by a circular plate, which is eccentrically mounted on the shaft 4, the circular plate having a rim 6a which extends beyond the plate in both directions.

Figure 6:
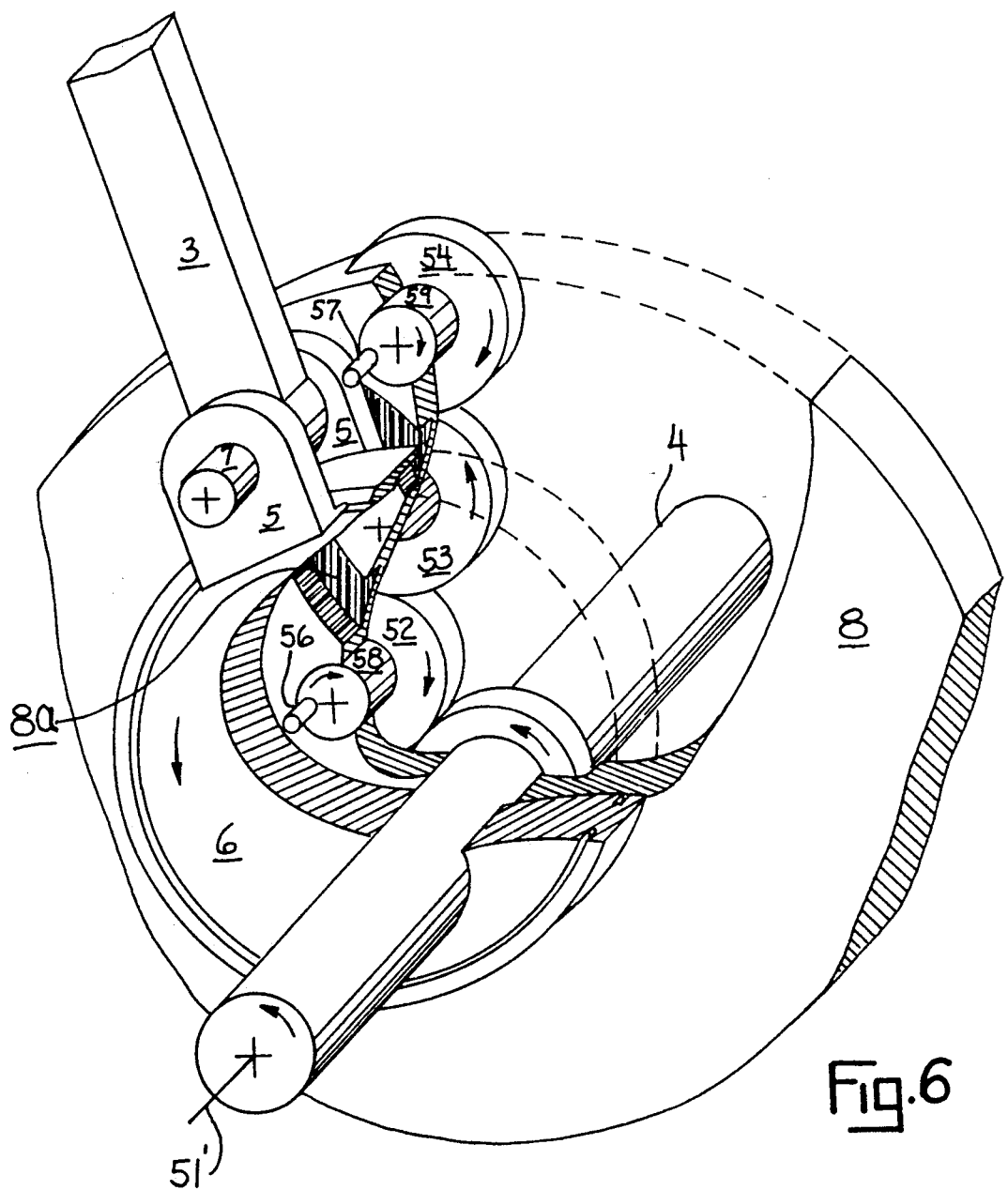
FIG. 6 is a partially broken away perspective view of the anti-reverse mechanism of FIGS. 4 and 5.

As shown best in FIGS. 2 and 6, the slipper 5 has a pair of side plates whose inner ends have in-turned flanges. The flanges loosely grip the rim 6a of the torque lobe 6 so that the slipper 5 can slide round the rim as the torque lobe rotates, but so that the slipper is constrained to it. Alternatively, the slipper 5 could be attached to the outer race of a roller bearing provided at the peripheral edge of the torque, lobe. The slipper 5 is provided with a pair of roller bearings 7 which constitute cam followers. The cam followers 7 are constrained to follow cam tracks 8a formed in plates 8 positioned on opposite sides of the torque lobe 6. The cam tracks 8a are generally elliptical.

The operation of the single cylinder engine of FIGS. 1 and 2 will now be described with reference to FIGS. 3a to 3d. The operating cycle is best understood by describing the operation starting with the piston 2 at TDC. In this position (see FIG. 3a), the piston 2 has just completed its compression stroke, ignition having taken place just before TDC. The expanding gases formed by the ignition explosion force the piston 2 to descend rapidly within the cylinder 1, whereby the connecting rod 3 and the slipper 5 force the torque lobe 6 to rotate to the position shown in FIG. 3b. This movement of the piston 2 is the power stroke of the engine. During the power stroke, the slipper 5 is constrained to follow a curved path defined by the elliptical cam tracks 8a, this enhances the torque produced by the engine by increasing the moment of the descending piston 2 about the axis of rotation (the axis of the shaft 4), in a manner described below with reference to FIGS. 7 and 8. If the cam followers 7 were not constrained to follow the cam tracks 8a, the slipper 5 would slide down the rim 6a of the torque lobe 6 and jam without resulting in continuous rotation of the torque lobe.

The elliptical cam tracks 8a cause the piston 2 to reach BDC just after the slipper 5 passes the geometric bottom dead center (see FIG. 3c), whereby the torque lobe 6 is rising at BDC to carry the slipper (and hence the piston) upwards into the exhaust stroke, reversal being prevented by an anti-reverse mechanism to be described below with reference to FIGS. 4 to 6.

Figure 3:
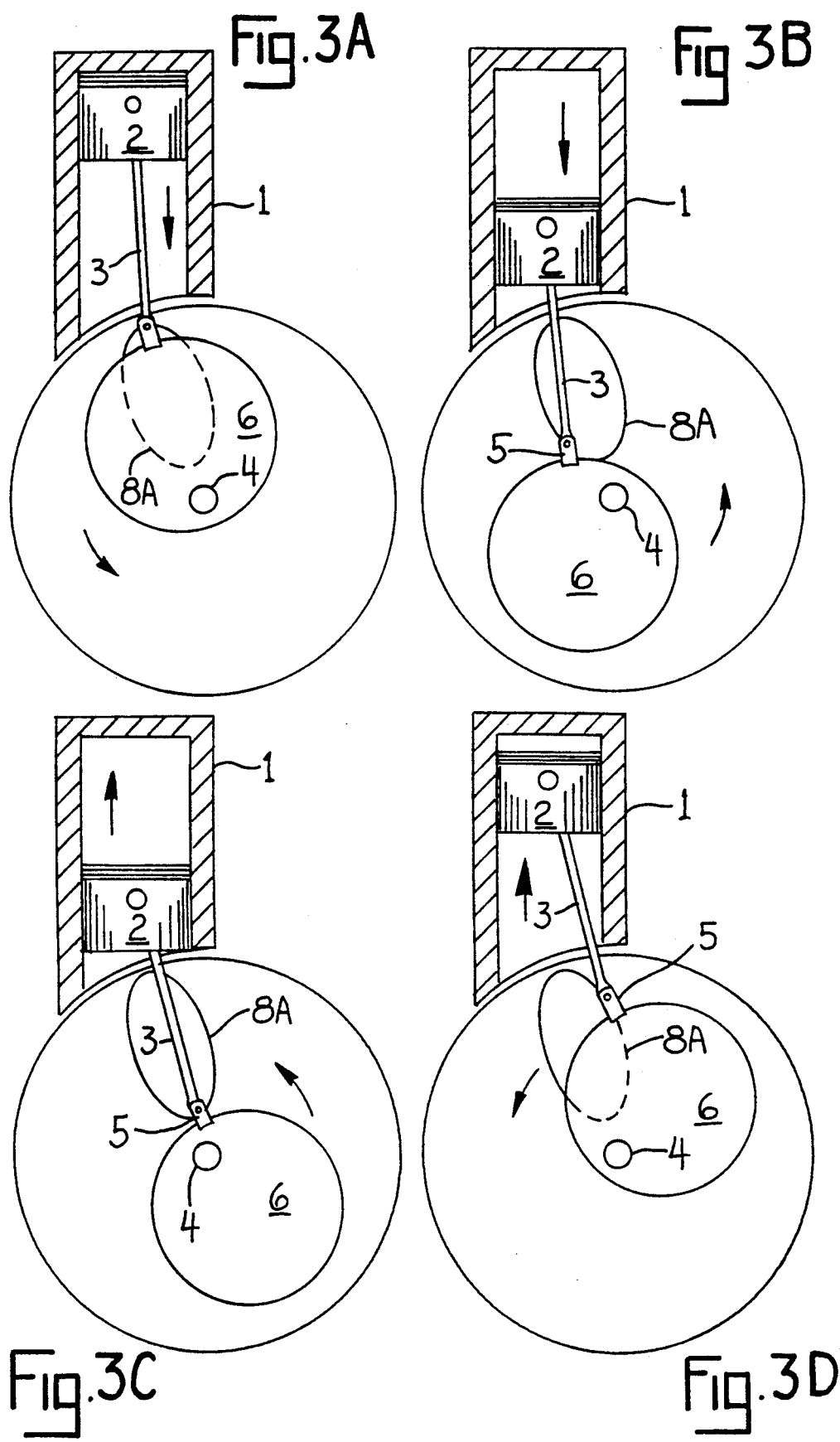
FIG. 3a, 3b, 3c and are diagrams illustrating different stages of the operation of the engine of FIGS. 1 and 2.

The momentum of a flywheel (not shown) on the output shaft 4 carries the piston 2 upwards through the position shown in FIG. 3d and towards TDC. After the piston 2 is carried past TDC, the momentum of the flywheel forces the piston and the slipper 5 down into the induction stroke. At the end of the induction stroke, with the piston 2 at BDC, the rising motion of the torque lobe 6 could cause the cam followers 7 to move back up those portions of the cam tracks 8a that they have just come down, and this would clearly be undesirable. To prevent this happening, the slipper 5 is provided with an anti-reverse mechanism, the action of which will be described below with reference to FIGS. 4 to 6.

Once the piston 2 has passed BDC, it is carried upwards into the compression stroke by the momentum of the flywheel. The operating cycle then starts again with the piston 2, the slipper 5 and the torque lobe 6 in the positions shown in FIG. 3a.

Figure 4:
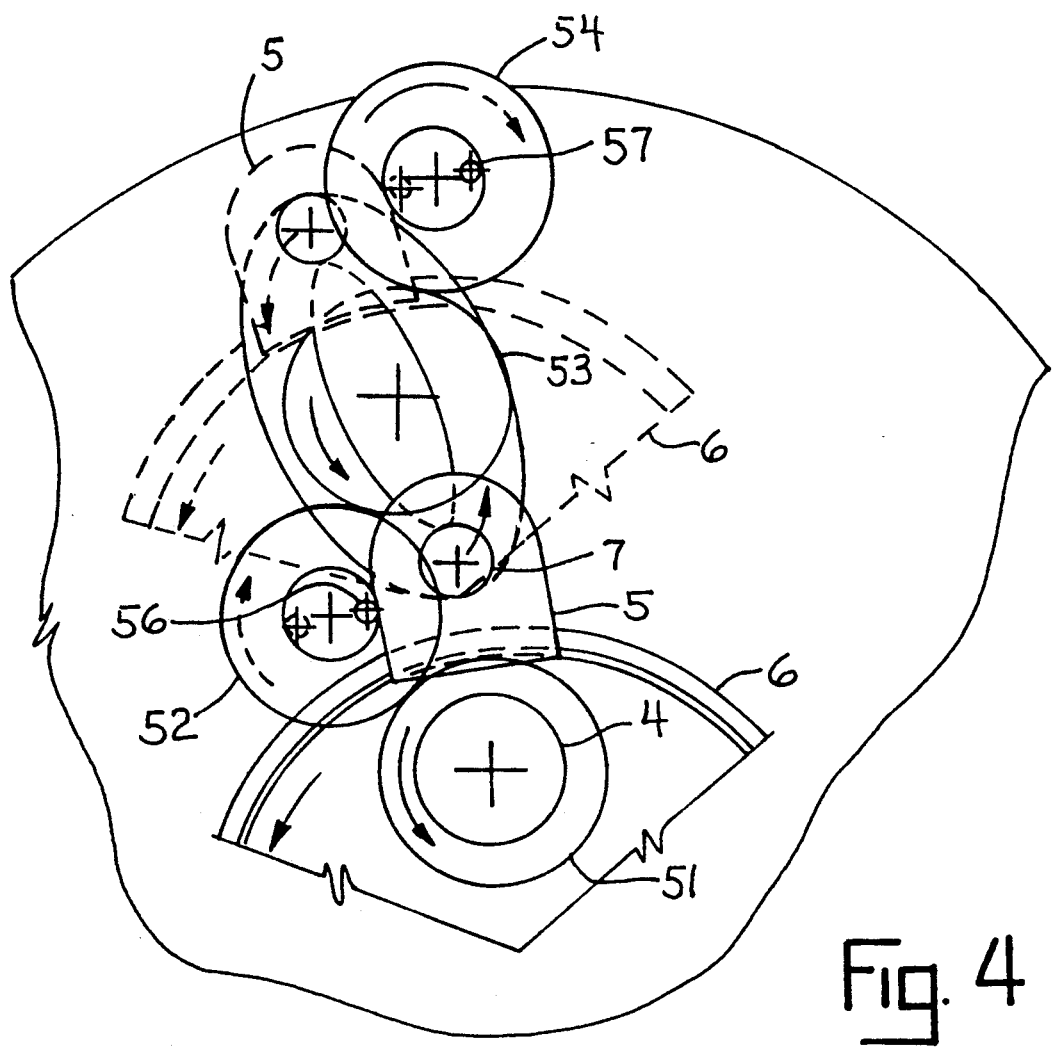
FIG. 4 is a schematic elevation of the anti-reverse mechanism which forms part of the engine of FIGS. 1 and 2.
Figure 5:
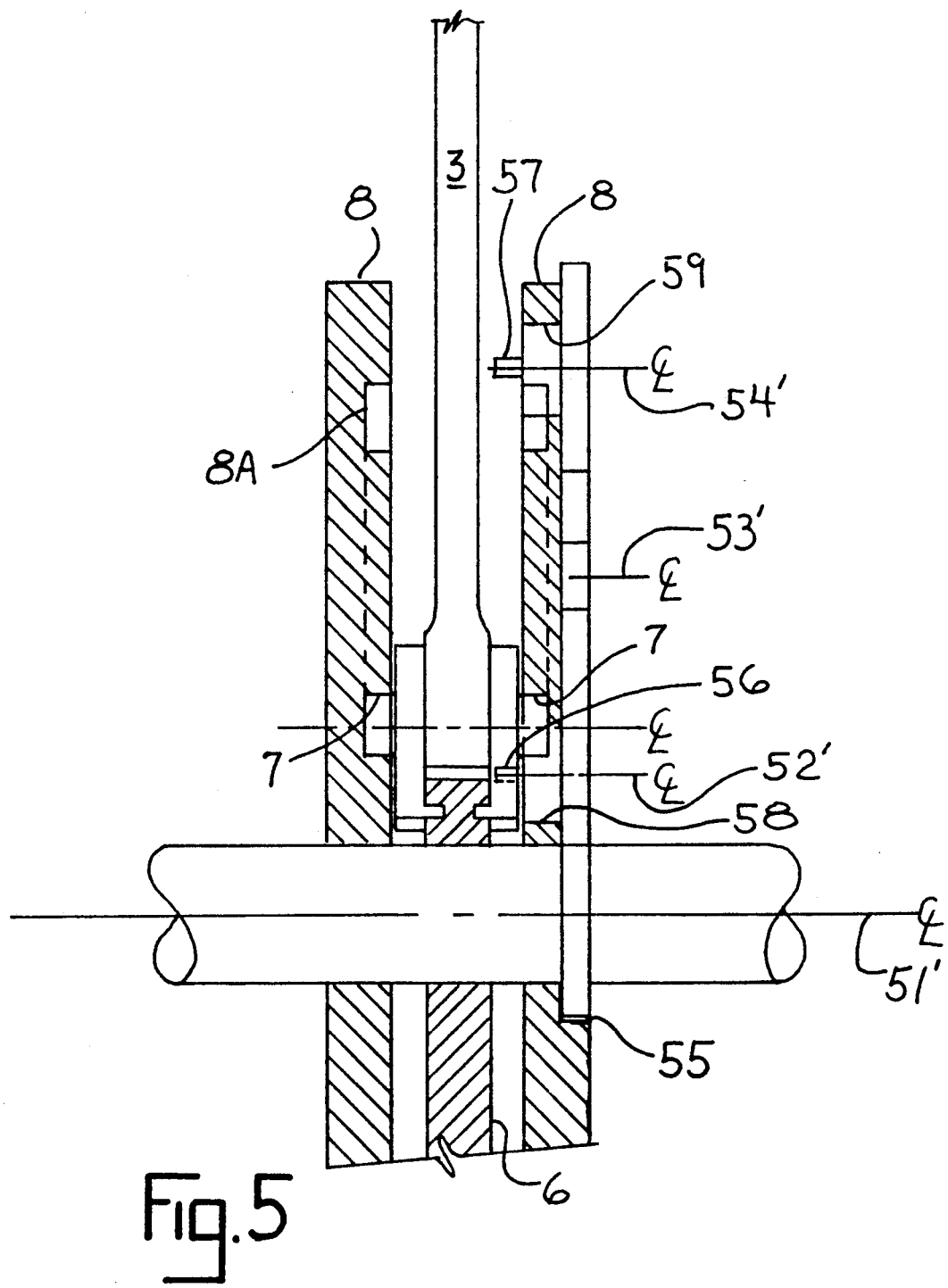
FIG. 5 is a schematic cross-section through the anti-reverse mechanism of FIG. 4.

Referring to FIGS. 4 to 6, the slipper 5 contains an anti-reverse mechanism constituted by four intermeshing gear wheels 51, 52, 53 and 54. The gear wheel 51 is an input gear wheel fixed to, and rotatable with, the shaft 4; the gear wheels 52 and 54 are output gear wheels; and the gear wheel 53 is an idler gear wheel. The gear wheels 51 to 54 are positioned in a recess 55 (see FIG. 5) formed in the outer face of one of the plates 8, the axes of the gear wheels being identified by the reference numerals 51' to 54' in FIG. 5. The gear wheel 52 carries an eccentrically-positioned pin 56, and the gear wheel 54 carries an eccentrically-positioned pin 57, the pins 56 and 57 are mounted on spigots 58 and 59 which are concentric with, and part of, the gear wheels 52 and 54, and pass through respective apertures formed in the plate 8 which supports the gear wheels 51 to 54. The pins 56 and 57 project inwardly beyond the inner face of that plate 8 so as to lie in the path of the slipper 5 as it is driven round the elliptical path defined by the tracks 8a. The gear wheel arrangement 51 to 54, and the eccentric positioning of the pin 56, are such that the pin 56 engages the slipper 5 to force the slipper to continue moving in the same direction-as the slipper passes through BDC, thereby preventing the slipper reversing its direction of movement at BDC. Similarly, the gear wheel arrangement 51 to 54, and the positioning of the pin 57, are such that the pin engages the slipper 5 to force the slipper to continue moving in the same direction as the slipper passes through TDC, thereby preventing the slipper reversing its direction of movement at TDC.

FIGS. 7a to 7d and 8a to 8d are diagrams illustrating the comparison between the torque of a conventional internal combustion engine and the torque of the engine of FIGS. 1 and 2. In FIG. 7a, the line 18 represents the axis of the piston and the circle 19 represents the movement of the crank pin (that is to say the center of action of the connecting rod), the center of the circle coinciding with the center of the output shaft of the engine. The positions A to G on the line 18 represent the positions of the piston corresponding to the rotation of the output shaft of 180° in 30° steps, position A being TDC and position G being BDC. The corresponding positions of the crank pin are-represented by the references A' to G' on the circle 19. For these positions, the moments are represented by the lines OA'' to OG''. where 0 is the center of the circle 19.

FIG. 7b is a graph showing assumed engine cylinder pressure (on ignition) against crank angle, the graph illustrating that the pressure is inversely proportional to the volume in the cylinder 1 above the piston 2. These pressure figures have been transposed directly from the line 18 shown in FIG. 7a. FIG. 7c is a graph showing the turning moment against the crank angle taken at 30° intervals from TDC, these turning moment figures being transposed directly from FIG. 7a. In order to get a measure of the resulting torque at these intervals, the moments plotted on the graph of FIG. 7c are multiplied by the pressures shown on the graph of FIG. 7b. Although these figures do not give an accurate figure for the torques produced by the conventional engine at the 30° steps, they do give a true comparison with the torque values relative to the values calculated in a similar manner for the engine of FIGS. 1 and 2.

The torque values for the engine of FIGS. 1 and 2 are calculated from FIG. 8, in which the line 18' represents the axis of the piston 2, and the circle 19' represents the center of rotation of the torque lobe 6, the center of the circle coinciding with the center of the output shaft 4 and is the same diameter as the circle 19 of FIG. 7a. As in FIG. 7a, the positions A to G on the line 18' represent the positions of the piston 2 corresponding to the rotation of the shaft 4 of 180° in 30° steps. The corresponding positions of the center of action of the connecting rod 3 (that is to say the slipper 5) are represented by the positions A' to G' oh the profile of the cam tracks 8a. For these positions, the moments are represented by the lines OA" to OG", where O is the center of the circle 19'. The torque values for each of the positions A to G is calculated in the same manner as that described above with reference to FIG. 7. Hence,, assuming that the pressure in the cylinders of the two engines are the same, it will be apparent, from a comparison of the respective graphs shown in FIGS. 7d and 8d, that the torque values for the engine of FIGS. 1 and 2 are considerably higher than those of the conventional engine for equal piston displacements (A to G) in each arrangement. To illustrate this more clearly, FIGS. 7d and 8d are graphs showing the products of the figures obtained from the graphs shown in FIGS. 7b and 7c, and 8b and 8c, the area under each of the graphs shown in FIGS. 7d and 8d being representative of the work done by each of the arrangements. Clearly, the engine of FIGS. 1 and 2 produces an average torque of over twice that of the conventional engine. To summarize, the torque lobe arrangement of the crank mechanism of the present invention, in matching the 'moment curve' to the 'pressure curve', greatly enhances the mechanical efficiency of the process of converting reciprocating motion to output torque.

Figure 9:
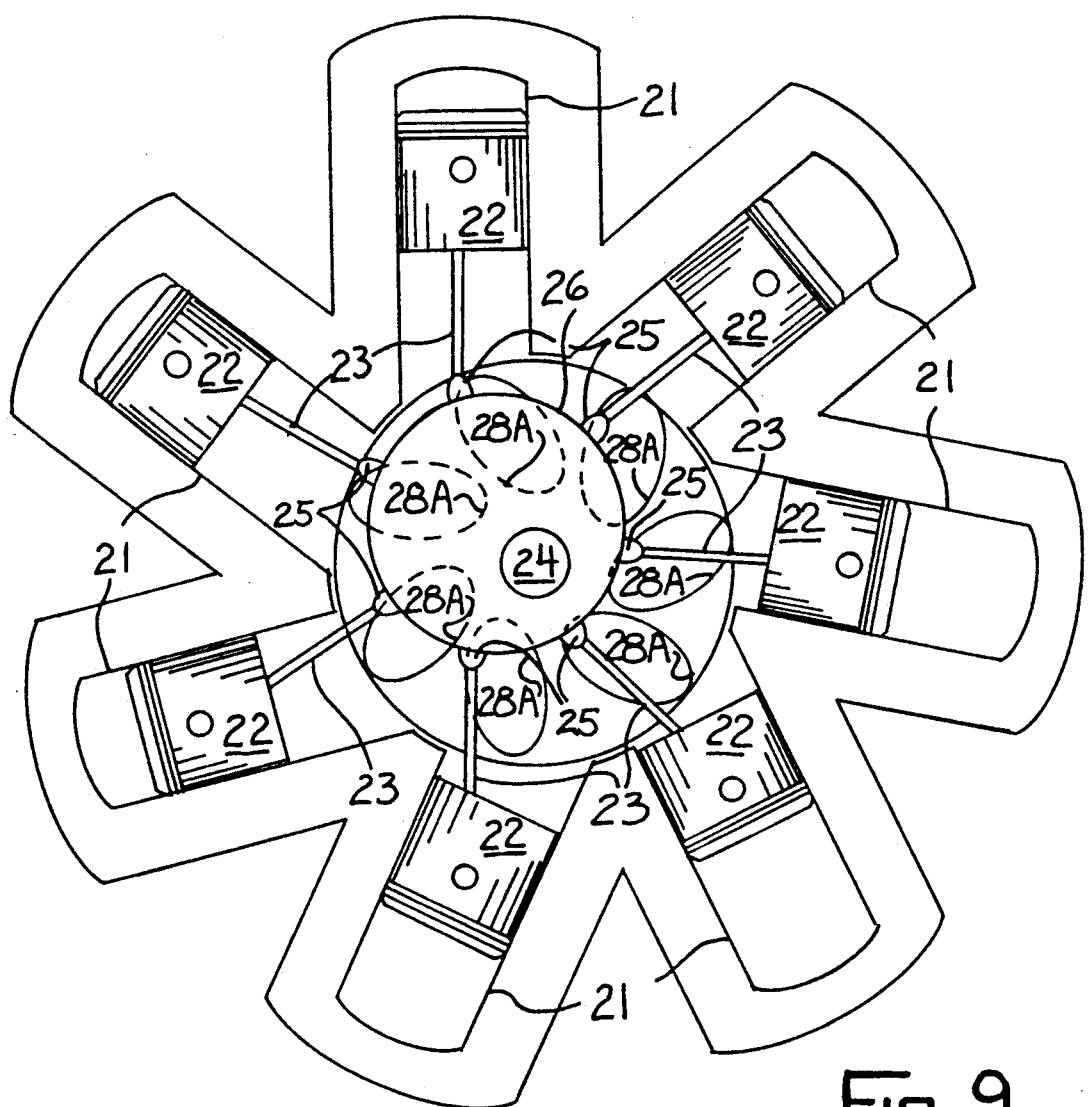
FIG. 9 is a plan view of a practical form of internal combustion engine incorporating a crank mechanism constructed in accordance with the invention.

FIG. 9 shows a practical form of internal combustion engine incorporating a crank mechanism constructed in accordance with the invention, this engine having seven cylinders 21 acting on a common torque lobe 26. Bach cylinder 21 has a respective piston 22, connecting rod 23 and slipper 25, and the torque lobe 26 is eccentrically mounted on an output shaft 24. As with the engine of FIGS. 1 and 2, each slipper 25 has a respective pair of cam tracks 28a formed in plates (not shown) on opposite sides of the torque lobe 26. In this embodiment, however, the slippers 25 must each be a loose sliding fit on the rim of the torque lobe 261 and cannot be attached to the outer race of a roller bearing provided at the peripheral edge of the torque lobe. The engine is a flat radial configuration with the output shaft 24 acting vertically downwards into a gear box (not shown), with the cylinders 21 arranged to fire in the order 1 3 5 7 2 4 6. This would require a distributor (not shown) to initiate a spark on both exhaust and compression strokes, and would enable the distributor to be driven directly from the output shaft 24 with no gearing. The whole arrangement would need a flywheel (not shown) to conserve momentum. Additional counter balancing for the oscillating mass of the pistons 22 and the rotating mass of the torque lobe 26 can be provided by internal balance weights mounted outside the plates 8 on the output shaft 4 and diametrically opposite to the torque lobe 6.

It would also be possible to operate either engine on a two-stroke cycle in this case, the anti-reverse mechanism may not be required, as the pressure in the cylinder(s) and the momentum stored in the flywheel should be sufficient to prevent the cam followers 7 moving the 'wrong' way along the cam tracks 8a at BDC, The crank mechanism of the invention could also be incorporated in other forms of reciprocating engine such as a steam engine obviously, such a crank mechanism could also form part of a pump, for converting rotary motion of an input shaft to reciprocatory motion of a piston within a cylinder. Such a pump would have a much greater efficiency than a conventionally-cranked device.

It will be apparent that the cam tracks 8a do not have to be elliptical. For example, they could be of any suitable closed-curve path to complement the characteristics of particular engine power requirements, and to exert maximum torque on the torque lobe.

What is claimed is:

1. A crank mechanism for an internal combustion engine, the crank mechanism comprising a cylinder, a piston reciprocable within the cylinder, and a rotatable shafts the piston being in drivable connection with the shaft via a connecting rod, a slipper and a torque lobe, the connecting rod being pivotally connected to the piston, and the slipper being pivotally attached to the free end of the connecting rod, wherein the torque lobe is a circular plate eccentrically mounted on the shaft for rotation therewith about the axis thereof, wherein the slipper is slidable along, but restrained to, a rim of the torque lobe, and wherein the slipper is constrained to move around a closed path whereby rectilinear movement of the piston is converted to rotary movement of the torque lobe or vice versa.

2. A crank mechanism as claimed in claim 1, wherein the rim of the torque lobe is constituted by a flange extending in both directions beyond the circular plate constituting the torque lobe, each slipper being formed with inturned flanges which slidably grip the torque lobe flange.

3. A crank mechanism for an internal combustion engine, the crank mechanism comprising a plurality of cylinders, a respective piston reciprocable within each of the cylinders, and a rotatable shaft, each of the pistons being in drivable connection with the-shaft via a respective connecting rod, a respective slipper and a common torque lobe, each connecting rod being pivotally connected to the associated piston, and each slipper being pivotally attached to the free end of the associated connecting rod, wherein the torque lobe is a circular plate eccentrically mounted on the shaft for rotation therewith about the axis thereof, wherein each slipper is slidable along, but restrained to, a rim of the torque lobe, and wherein each slipper is constrained to move around a respective closed path whereby rectilinear movement of the pistons is converted to rotary movement of the torque lobe or vice versa.

4. A crank mechanism as claimed in claim 1 or claim 3, wherein the or each slipper is provided with cam follower means which engage with associated track means adjacent to the torque lobe, the cam follower means and the cam track means constituting means for constraining that slipper to move round the associated closed path.

5. A crank mechanism as claimed in claim 4, wherein the or each slipper is provided with a pair of cam followers which engage with a respective pair of cam tracks formed symmetrically in a pair of plates positioned on opposite sides of the torque lobe.

6. A crank mechanism as claimed in claim 5, wherein the cam followers of the or each slipper are bearings.

7. A crank mechanism as claimed in claim 6, wherein the cam followers are roller bearings.

8. A crank mechanism as claimed in claim 5, wherein the cam tracks associated with the or each slipper are of elliptical configuration.

9. A crank mechanism as claimed in claim 8, wherein the major axes of the or each pair of elliptical cam tracks do not pass through the output shaft.

10. A crank mechanism as claimed in claim 1, wherein each slipper is provided with an anti-reverse mechanism for ensuring that that slipper moves round the associated closed path in one direction only.

11. A crank mechanism as claimed in claim 10 wherein each anti-reverse mechanism is such as to ensure that the associated cam followers are moved through the major axes of the associated pair of elliptical cam tracks before the associated piston reaches BDC or TDC on each stroke.

12. A crank mechanism as claimed in claim 11, wherein each anti-reverse mechanism is constituted by two rotatable wheels, each of which is in drivable engagement with the shaft, and each of which is provided with an eccentrically-positioned pin, the mechanism being such that one of the pins is engageable with the associated slipper as the associated piston reaches BDC on each stroke, and such that the other pin in engageable with the associated slipper as the associated piston reaches TDC on each stroke.

13. A crank mechanism as claimed in claim 12, wherein the rotatable wheels of each anti-reverse mechanism are gear wheels, one of which drives the other, and wherein said one gear wheel is in drivable engagement with a further gear wheel fixed to, and rotatable with, the shaft.

14. A crank mechanism as claimed in claim 13, wherein each anti-reverse mechanism further comprises an idler gear wheel in meshing engagement with said rotatable gear wheels.

15. A crank mechanism as claimed in claim 13, when appendant to claim 3, wherein the further gear wheel is common to all the anti-reverse mechanisms.

16. A crank mechanism as claimed in claim 12, wherein the rotatable wheels of each anti-reverse Mechanism are housed in a respective recess formed in a plate parallel, and adjacent, to the torque lobe.

* * * * *